(12) United States Patent
Conrad et al.

(10) Patent No.: US 10,410,281 B1
(45) Date of Patent: Sep. 10, 2019

(54) SYSTEMS AND METHODS FOR IDENTIFYING AND CAPTURING POTENTIAL BANKCARD SPENDING

(75) Inventors: Christopher R. Conrad, Philadelphia, PA (US); Chris Hurlebaus, Chadds Ford, PA (US); Guoxing Sha, Wilmington, DE (US); Pavel Nedanov, Newark, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 2383 days.

(21) Appl. No.: 12/174,154

(22) Filed: Jul. 16, 2008

(51) Int. Cl.
*G06Q 40/00* (2012.01)
*G06Q 40/02* (2012.01)
*G06Q 40/04* (2012.01)

(52) U.S. Cl.
CPC .............. *G06Q 40/02* (2013.01); *G06Q 40/04* (2013.01)

(58) Field of Classification Search
CPC ..................................................... G06Q 40/00
USPC ......................................... 705/35, 39, 38, 40
See application file for complete search history.

(56) References Cited

U.S. PATENT DOCUMENTS

| | | | | |
|---|---|---|---|---|
| 7,676,432 | B2 * | 3/2010 | Ling .............................. | 705/39 |
| 8,341,057 | B1 * | 12/2012 | Wagner et al. ............ | 705/36 R |
| 8,423,452 | B1 * | 4/2013 | Ley et al. ...................... | 705/38 |
| 2004/0133474 | A1 * | 7/2004 | Tami et al. ..................... | 705/16 |
| 2007/0028258 | A1 * | 2/2007 | Wollmershauser .... | G06Q 30/06 |
| | | | | 725/29 |

OTHER PUBLICATIONS

Hatsopolous et al. 1998. "U.S. competitiveness: beyond the trade deficit." American Association for the Advancement of Science, vol. (241) issue (n4863). Retrieved from https://dialog.proquest.*

* cited by examiner

Primary Examiner — Ojo O Oyebisi
(74) Attorney, Agent, or Firm — Hunton Andrews Kurth LLP

(57) ABSTRACT

The invention provides a method and system for a financial institution for capturing the business of a financial services customer. The system may include a data access system for obtaining and storing data; and an analysis system for processing the data. The analysis system (1) selects a study group of customers from the data; (2) observes the study group so as to produce a profile of each study group customer's financial information; (3) produces a mathematical representation of an interrelationship between study group customers' profiles and the data; (4) applies the mathematical representation to customers not within the study group in order to estimate those customers' profiles; (5) identifies a portion of the customer's monetary flow eligible to be conducted through the financial institution, the identification based in part on the customer's profile; and (6) does not require direct input from the customer. The system may further include a marketing system for producing, outputting and implementing a marketing strategy; and storage systems. In addition, the analysis system may utilize processing including producing a profile of the customer's financial information, the profile including an itemization of the customer's monetary inflow and outflow; and identifying a portion of the customer's monetary flow eligible to be conducted through the financial institution, the identification based in part on the customer's profile.

15 Claims, 15 Drawing Sheets

Acronym Table
(Acronyms used in description)

| | |
|---|---|
| ANCF | Available net cash flow |
| SP | Spending profile |
| PCCB | Potential credit card business |
| MS | Marketing strategy |
| EMS | Execution of a marketing strategy |
| ASCC | Ability to spend using credit cards |

Fig. 15

SYSTEMS AND METHODS FOR IDENTIFYING AND CAPTURING POTENTIAL BANKCARD SPENDING

BACKGROUND OF THE INVENTION

Bankcards, such as credit cards, debit cards, and various others, are in wide use in the current market place. Encouraging individuals to increasingly utilize bankcards to make purchases is a complicated challenge faced by financial institutions. A financial institution encounters significant competition when attempting to acquire new customers and increase the institution's share of existing customers' card spending.

Typically, acquiring new customers and growing the share of a customer's spending involves marketing strategies based on industry rules of thumb and targeting of customers according to broad categories. This lack of individualization for marketing, commonly employed by financial institutions, has curtailed efforts to acquire new customers and grow an institution's share of existing customers' spending.

The known technology is lacking in this respect.

SUMMARY OF THE INVENTION

The invention provides a method and system for a financial institution for capturing the business of a financial services customer. The system may include a data access system for obtaining and storing data; and an analysis system for processing the data. The analysis system (1) selects a study group of customers from the data; (2) observes the study group so as to produce a profile of each study group customer's financial information; (3) produces a mathematical representation of an interrelationship between study group customers' profiles and the data; (4) applies the mathematical representation to customers not within the study group in order to estimate those customers' profiles; (5) identifies a portion of the customer's monetary flow eligible to be conducted through the financial institution, the identification based in part on the customer's profile; and (6) does not require direct input from the customer. The system may further include a marketing system for producing, outputting and implementing a marketing strategy; and storage systems. In addition, the analysis system may utilize processing including producing a profile of the customer's financial information, the profile including an itemization of the customer's monetary inflow and outflow; and identifying a portion of the customer's monetary flow eligible to be conducted through the financial institution, the identification based in part on the customer's profile. Any of a wide number and variety of customers and study groups may be utilized in the processing of the invention.

BRIEF DESCRIPTION OF THE DRAWINGS

The present invention can be more fully understood by reading the following detailed description together with the accompanying drawings, in which like reference indicators are used to designate like elements, and in which:

FIG. 15 is a table listing acronyms as discussed herein, in accordance with aspects of the invention.

DETAILED DESCRIPTION OF THE INVENTION

Hereinafter, various aspects of embodiments of the invention will be described. As used herein, any term in the singular may be interpreted to be in the plural, and alternatively, any term in the plural may be interpreted to be in the singular.

What is disclosed herein is a system and method for identifying and capturing potential bankcard spending. The invention uses innovative techniques to obtain highly individualized and detailed assessments of a customer's financial profile. The invention produces a marketing strategy that is highly effective and readily implemented. The invention can be supported using relatively simple hardware and software.

Various embodiment set forth herein are described in the context of a "credit card" and associated processing. However, it is understood that the invention has a much broader field of applicability. For example, with regards to financial transaction tools, the invention (and various features thereof) pertain to any type of bankcard or account, such as debit cards, check cards, automated clearing houses, automated teller machines, online banking channels, and personal financial tools, for example, among many others.

Figure 1:
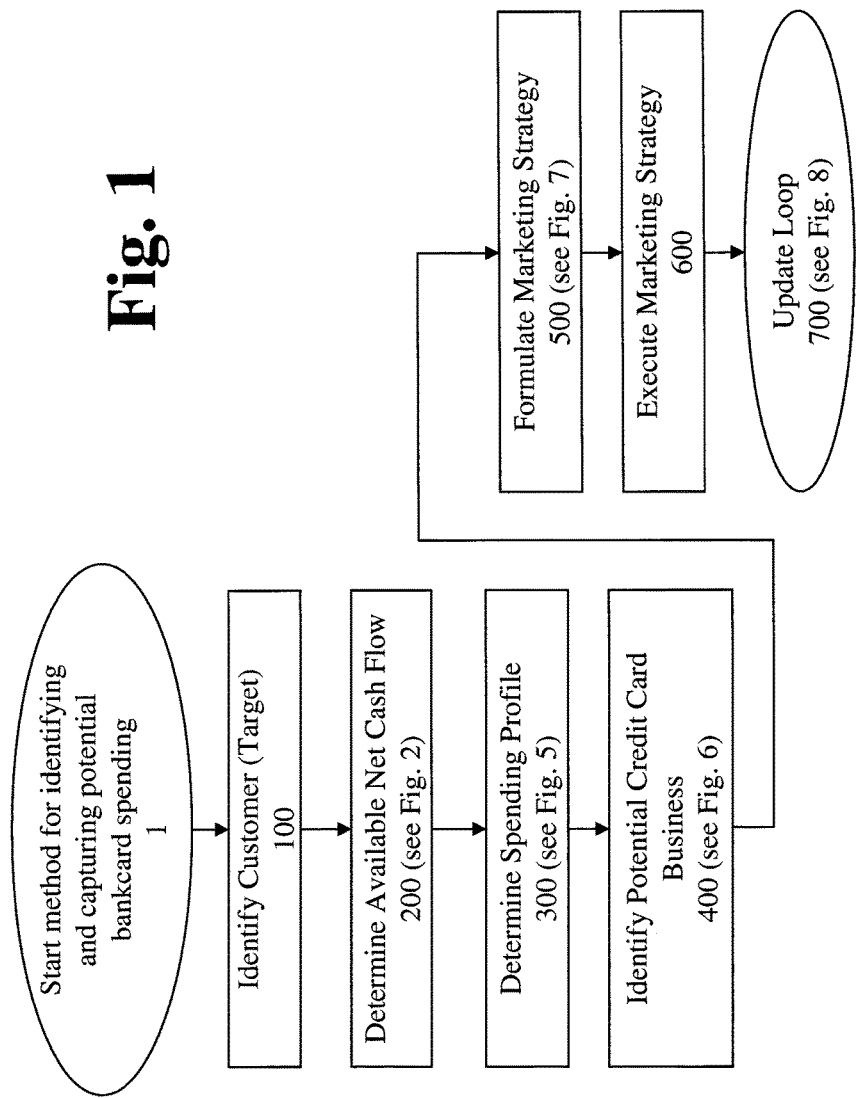
FIG. 1 is a high level flowchart showing a marketing process in accordance with one embodiment of the invention.

FIG. 1 is a high level flow chart in accord with one embodiment of the invention which begins at step 1. Then, the process passes to step 100. In step 100, the process identifies a target, such as for example, an individual, household, institution, small business, large business, division, team, unit, or any other type of potential customer or current customer (or any breakout/subpart of such potential customer or current customer). Hereinafter a "customer" includes any of such targets.

Step 200 then determines how much of that customer's finances can be considered "available net cash flow" (ANCF). In some instances a customer's ANCF can be summarized as the customer's "ability to pay" for goods or services they desire to purchase. The determination of a customer's ANCF may be achieved through a variety of methods or a fusion of various methods. One embodiment of the invention determines a customer's ANCF by calculating the precise budget of that customer, as based on that customer's income and expenses, for example. Since this approach starts with overall income and subtracts various budgetary items until the ANCF is estimated, this approach is herein referred to as a "top down" approach.

One embodiment of the invention determines customers' ANCF by first thoroughly studying the spending and financial behaviors of a controlled group of customers. This study then provides a basis of comparison to which other customers outside of the study group are compared according to a variety of their characteristics, such as, for example, their financial attributes. The ANCF of these other customers is then determined by comparing the variety of characteristics of these customers to those of the study group. Since this method starts with a number of customer characteristics of a customer and builds up to the estimate of ANCF of that customer, this approach is herein referred to as a "bottom up" approach.

In accordance with one embodiment, step 300, of FIG. 1, determines a customer's spending profile (SP). The spending profile captures characteristics of that customer's spending that will facilitate marketing products to that customer. The spending profile of a customer may be related to the ANCF of a customer. For example, a customer whose spending profile indicates that they spend more than their ANCF may have to "reign in" his spending habits before he encounters a difficult financial situation. Fluctuations in spending may also occur when a customer opens a new account and runs up a high balance initially, or when a customer is going bankrupt. One embodiment of the invention therefore produces a continuous, numeric output at an individual level of a customer's steady state ability to spend. Such an output is not susceptible to misleading temporary imbalances in a customer's spending behavior, spending profile or ANCF.

After step 300 of FIG. 1, the process passes to step 400. Step 400 illustrates how one embodiment identifies the potential credit card business (PCCB), or portion of a customer's spending that could be acquired by the financial institution. In the case of credit cards, the spending profile may be used to determine a customer's ability to spend using credit cards (ASCC) from the ANCF. This ASCC then forms the basis for the potential credit card business. In one embodiment, the PCCB of a customer is related to that customer's spending profile and ANCF. In accordance with one embodiment, a financial institution identifies the potential credit card business on the basis of whether the customer could be encouraged to spend more (of the customer's ANCF) by offering products attractive to the customer. Further, an embodiment identifies the potential credit card business based on the possibility of enticing a customer to change her spending profile, for example by shifting spending to that financial institution from another institution.

In accordance with one embodiment, step 500 formulates a marketing strategy (MS) for an individual customer. In one embodiment, the marketing strategy is related to the potential credit card business of an individual customer and is designed to acquire the potential credit card business of that customer. In other embodiments the marketing strategy is designed to achieve other objectives such as increased customer satisfaction with the financial institution. In determining a marketing strategy, one embodiment takes into account the marketing tactics available to the financial institution and the constraints on marketing approaches, among other considerations.

The invention enables the execution of a marketing strategy (EMS) in step 600. In step 700, some embodiments update the marketing strategy under a variety of circumstances. These updates are continuous or occasional and account for changes in a customer's behavior, changes external to the customer, as well as effects brought about by the execution of the marketing strategy (EMS). Hereinafter the high level method steps set forth above are described in greater detail.

Figure 9:
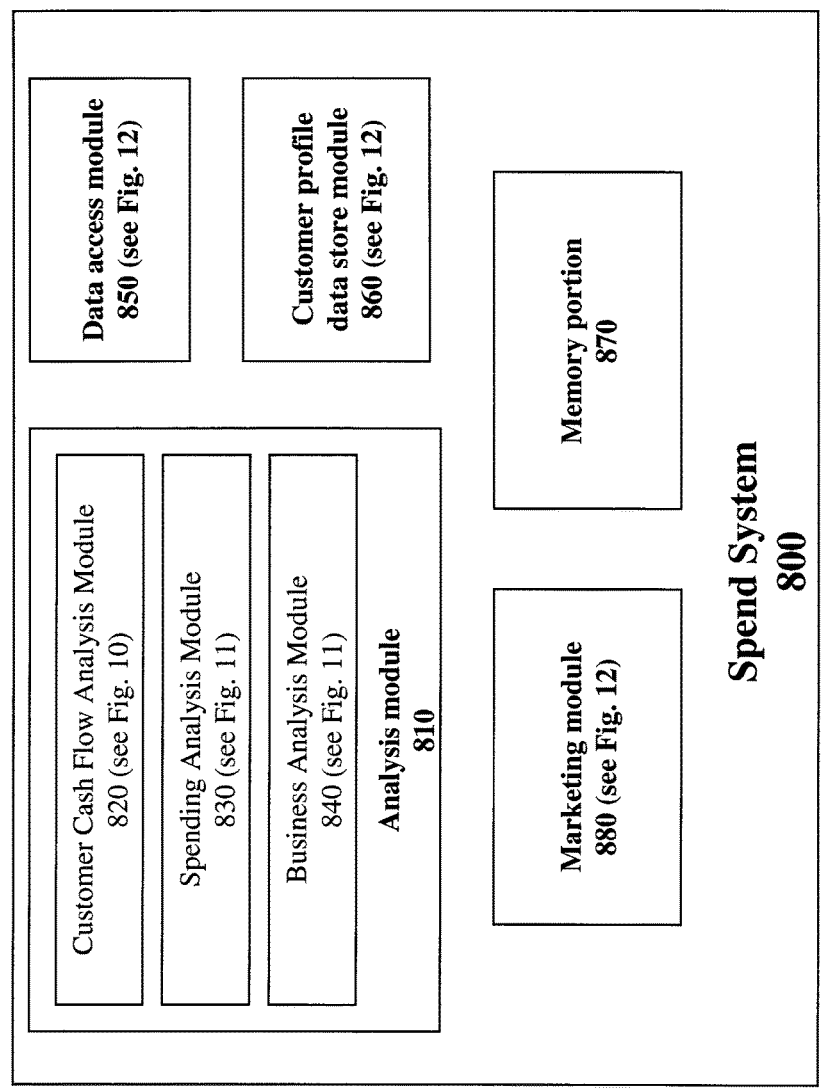
FIG. 9 is a block diagram showing a spend system in accordance with one embodiment of the invention.

FIG. 9 provides a high level block diagram of one embodiment of the spend system 800 that performs the methods of the invention. The spend system 800 includes an analysis module 810, a data access module 850, a customer profile data store module 860, a memory portion 870 and a marketing module 880. As shown in FIG. 9, the analysis module 810 includes a Customer Cash Flow Analysis Module 820, Spending Analysis Module 830 and Business Analysis Module 840, in accordance with one embodiment of the invention.

The invention utilizes a variety of data from sources both internal and external to the financial institution. The data access module 850 accesses this data. For illustrative purposes, this data may be derived from sources such as: financial records for customers of the institution, financial summaries available when underwriting new applications, the credit bureau, companies specializing in assembling dossiers of financial information, state and county property records and demographics sources, for example. The data access module 850 accesses these sources and retrieves data such as: customer income (salary, gifts or monies from investments for example), wealth such as investments and retirement funds, retail deposit information, debt, expenses (mortgage payments, utilities or groceries for example), taxes (federal, state, local), home value data, past spending habits, average absolute change in bankcard trade balance, highest bankcard line, credit limits of open mortgage trades, utilization rate of open bankcard trades, discretionary spending index, value of vehicles owned, demographic clusters, maximum balance on bankcards and demographic information, for example. The data access module 850 may then output the obtained data, so as to make such data available for utilization by other modules of the spend system 800.

Figure 2:
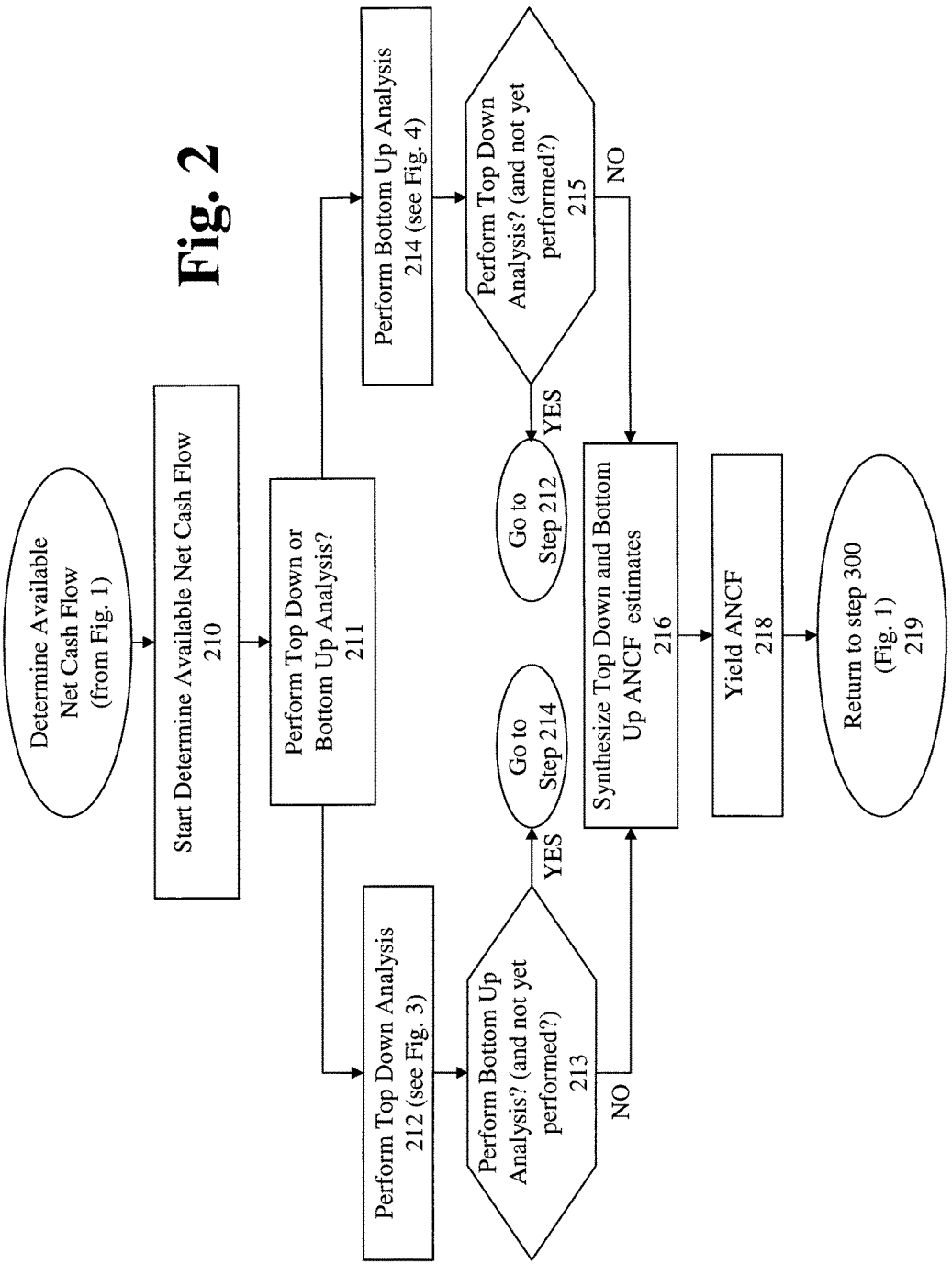
FIG. 2 is a flowchart showing further details of the "determine available net cash flow" step of FIG. 1 in accordance with one embodiment of the invention.

Returning to the processing of FIG. 1, the "determine available net cash flow" step 200 of FIG. 1 is shown in greater detail in FIG. 2. In accordance with one embodiment, the sub-process shown in FIG. 2 starts at step 210 and then passes to a decisioning step. That is, in step 211, the processing provides a choice of whether to perform top down or bottom up analysis. As is illustrated by FIG. 2, the method may include any combination of the top down or bottom up analysis. For example, the method may proceed from step 211 to perform the top down analysis 212. After performing the top down analysis the method may then proceed to step 216 or back to step 214 to perform the bottom up analysis. The "and not yet performed" in the processing of steps 213 and 215 reflect that if the bottom up analysis has already been performed upon the decisioning of step 213 (or the top down analysis has already been performed upon the decisioning of step 215), then the process passes to step 216.

After either of steps 213 or 215, the process passes to step 216. In step 216, the process synthesizes, as needed, the results of the computational method to produce a determination of a customer's ANCF. That is, if both a bottom up analysis and a top down analysis was performed, then the step 216 synthesis the results of that processing. The process then passes to step 219, and returns to step 300.

Figure 3:
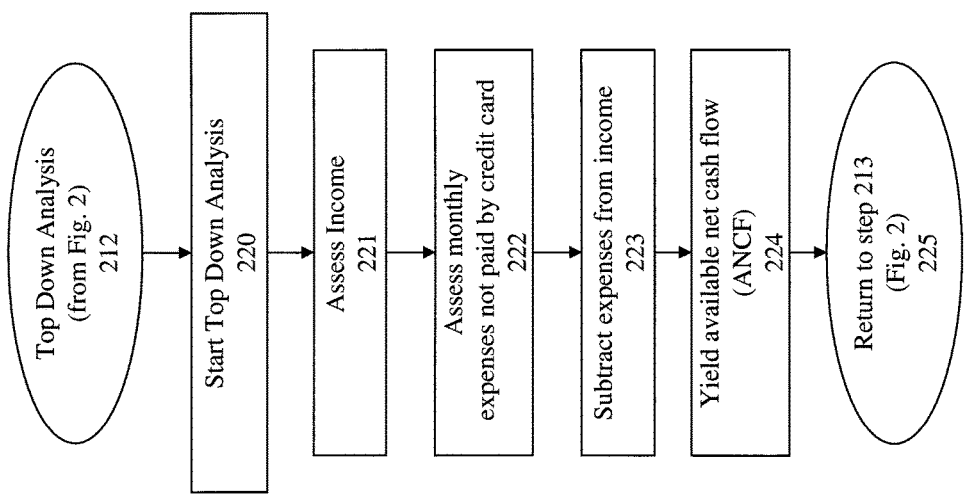
FIG. 3 is a flowchart showing further details of the "Top Down Analysis" step of FIG. 2 in accordance with one embodiment of the invention.

In accordance with one embodiment, FIG. 3 provides the details of the top down analysis 212. Generally speaking, the top down analysis 212 calculates the precise budget of a customer based on that customer's income and expenses. This top down approach starts at step 220 and proceeds to step 221, where the method inputs the data in the data access module 850 pertaining to a customer's income. In one embodiment, step 221 uses the customer's income per month. The next step 222 assesses monthly expenses not paid by credit cards. In one embodiment, these expenses are identified because they are not considered to be eligible (i.e., eligible for credit card payment), acceptable or typically paid with a credit card. A possible example of such an expense is a mortgage payment. Since the income and expense data may have significant variability month to month, the method may smooth the estimates by using a six month average, for example. Then, as illustrated in step 223, these expenses are subtracted from income. This processing, as reflected by step 224 of FIG. 1 3, results in that customer's available net cash flow (ANCF).

After step 224, the process passes to step 225. In step 225, the, the process returns to step 213 of FIG. 2.

Figure 4:
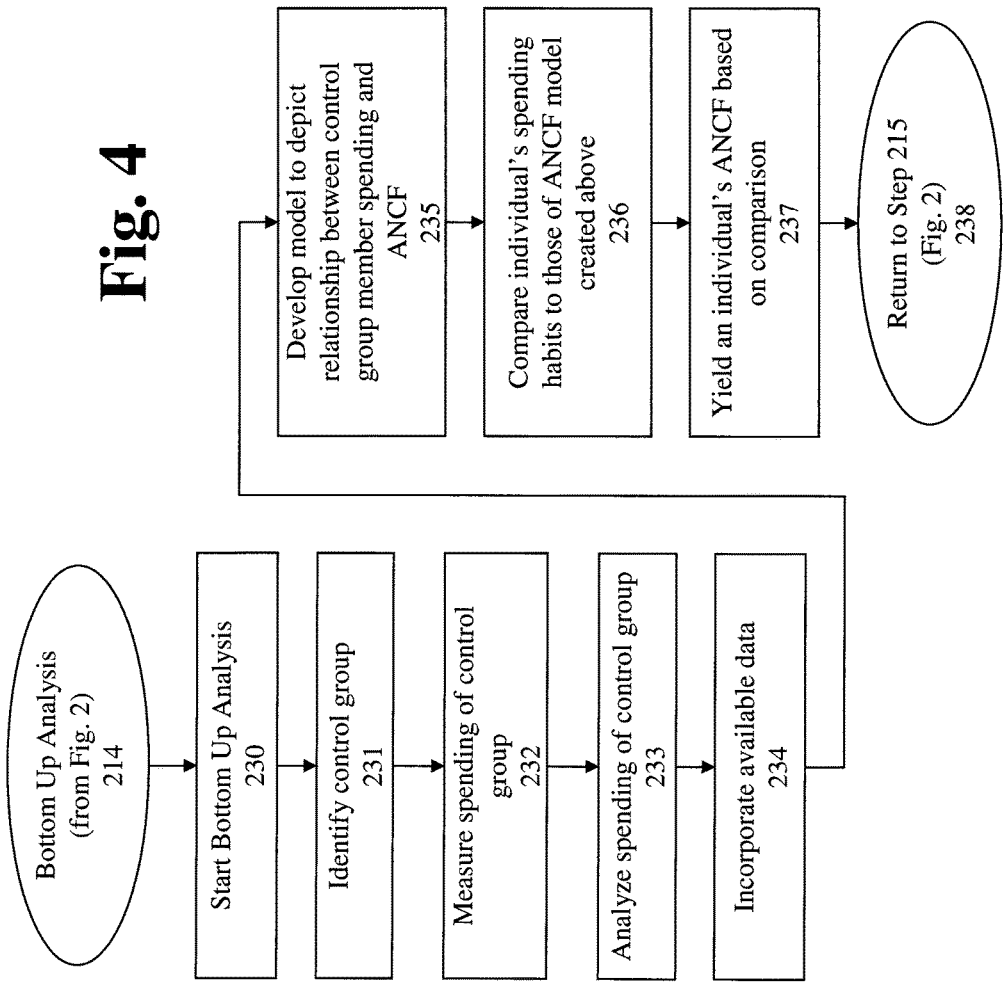
FIG. 4 is a flowchart showing further details of the "Bottom Up Analysis" step of FIG. 2 in accordance with one embodiment of the invention.

FIG. 4 illustrates in greater detail the bottom up analysis of step 214 in FIG. 2, in accordance with one embodiment. This process begins at step 230. Then, in step 231, the process includes identifying a control group for in depth study of their spending habits. In some cases, it is desirable to obtain data for every financial activity for every member of the control group. Complete capture of control group financial data can be achieved, for example, by constructing the control group out of customers who perform all of their financial transactions with the single financial institution. In such a situation, the financial institution has complete visibility of the customers' spending and income. Thus, such a thorough visibility of the person (with all their financial transactions with a single financial institution) allows effective extrapolation of that person's behavior, so as to understand and anticipate other person's behavior, for example.

Next, in step 232, the process includes measuring the spending of the control group. This may include taking rigorous data on their spending behaviors. Such data is similar to that previously mentioned, but can be more or less detailed. Then, in step 233, analysis of the control group's spending forms the basis for the development of a predictive model to relate customer spending behavior to ANCF. After step 233, the process passes to step 234.

In step 234, external data is incorporated into the data of the control group, to the extent that such data is available (or desired to be utilized with the control group data).

Then, in step 235, the observations of the control group 234 as well as the analysis of the control group's spending 233 are incorporated into a model. The development of a model to depict the relationship between the control group member spending and ANCF can be implemented in a number of appropriate techniques. Such techniques include but are not limited to regression, classification, cluster analysis, discriminant analysis, factor analysis, neural networks, logistic regression, statistical analysis, statistical forecasting, case based analysis, rule based analysis, and/or other techniques, for example.

In one embodiment, the model establishes a relationship between ANCF and other parameters. For example, the model might establish a relationship between ANCF vis-à-vis average monthly taxes, dinners out per month, and tuition per month, as follows:

$$ANCF=\alpha*(\text{average monthly taxes})+\beta*(\text{dinners out per month})+\chi*(\text{tuition per month})$$

where $\alpha$, $\beta$ and $\chi$ represent constants determined through the model development process 235.

Thus, the model may yield the identification of key known parameters (of a target customer), which may then be used to estimate unknown parameters (of the target customer).

That is, once the model is developed, the model provides a basis for predicting the ANCF of customers not studied in the control group, as reflected in step 236. For example, in one embodiment, data obtained from the data access module 850 is then input into the model to estimate the customer's ANCF. Then, in step 237, the customer's estimated ANCF is output.

After step 237, the process passes to step 238. In step 238, the process returns to step 215 of FIG. 2.

Figure 10:
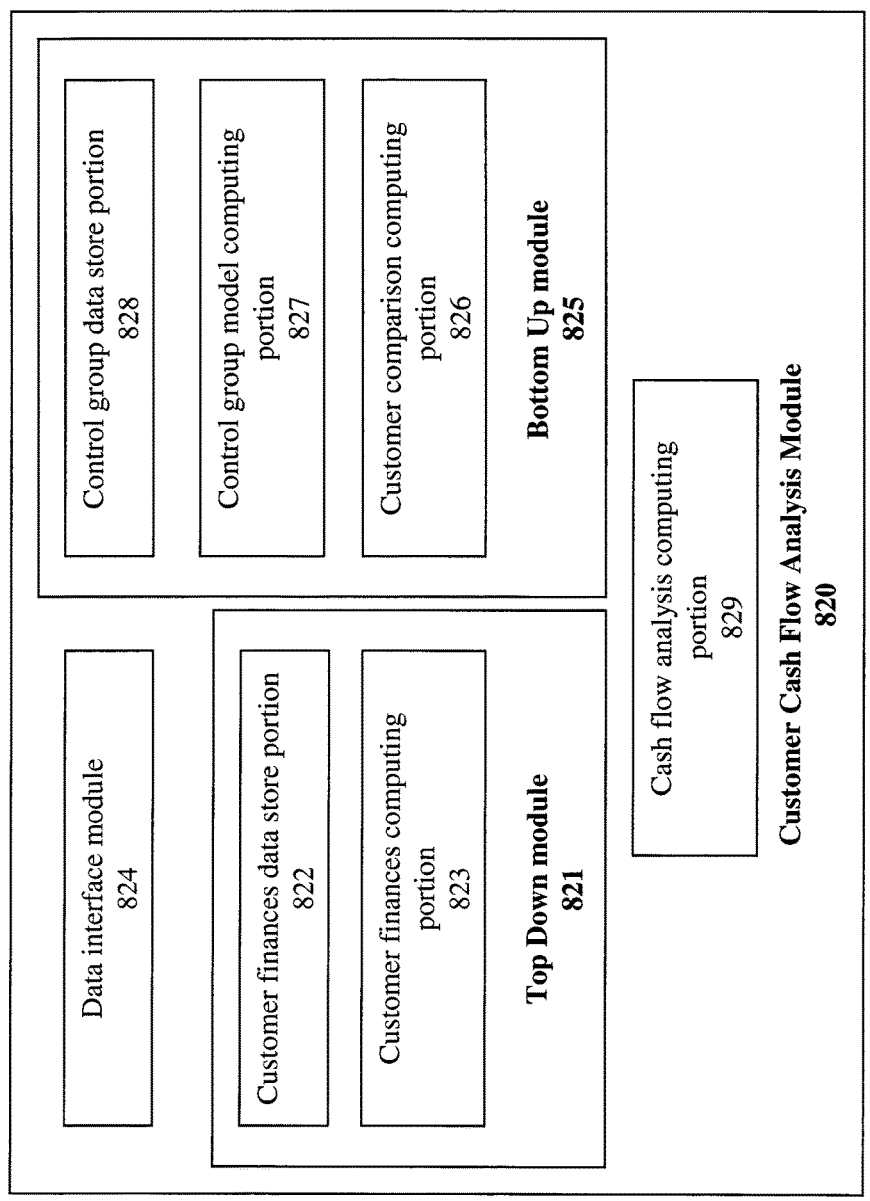
FIG. 10 is a block diagram showing further details of the spend system, and in particular the customer cash flow analysis module, in accordance with one embodiment of the invention.

FIG. 10 is a block diagram showing the customer cash flow analysis module 820 in greater detail, in accordance with one embodiment. As shown, this embodiment includes a data interface module 824, top down module 821, bottom up module 825 and a cash flow analysis computing portion 829. In one embodiment, the cash flow analysis module 820 computes ANCF for a customer. The customer cash flow analysis module 820 has portions specifically designed for certain computation methods. For example, the top down module 821 includes a customer finances data store portion 822 for storing detailed finance information for each customer. The customer finances computing portion 823 is capable of calculating the ANCF of a customer at least partially based on the data stored in the customer finances data store portion 822.

Further, in accordance with one embodiment, the bottom up module 825 is designed to perform the detailed analysis of the control group and associated predictive model development. The bottom up module therefore includes a control group data store portion 828, control group model computing portion 827 and a customer comparison computing portion 826. The control group model computing portion 827 constructs a predictive model based at least in part on the data stored in the control group data store portion 828. The customer comparison computing portion 826 applies the predictive model developed by the control group model computing portion to customer data in order to estimate that customer's ANCF, for example.

In accordance with one embodiment, the data interface module 824 allows other portions of the customer cash flow analysis module 820 to isolate specific customer finance data in an appropriate data portion (for example the data access module 850). The customer cash flow analysis module 820 has a computing portion 829 that synthesizes and organizes the operations and computations of the modules contained within the customer cash flow module 820. In accordance with one embodiment, the cash flow analysis computing portion 829 may interface with both the top down module 821 and bottom up module 825 and reconcile differences in their outputs.

Figure 5:
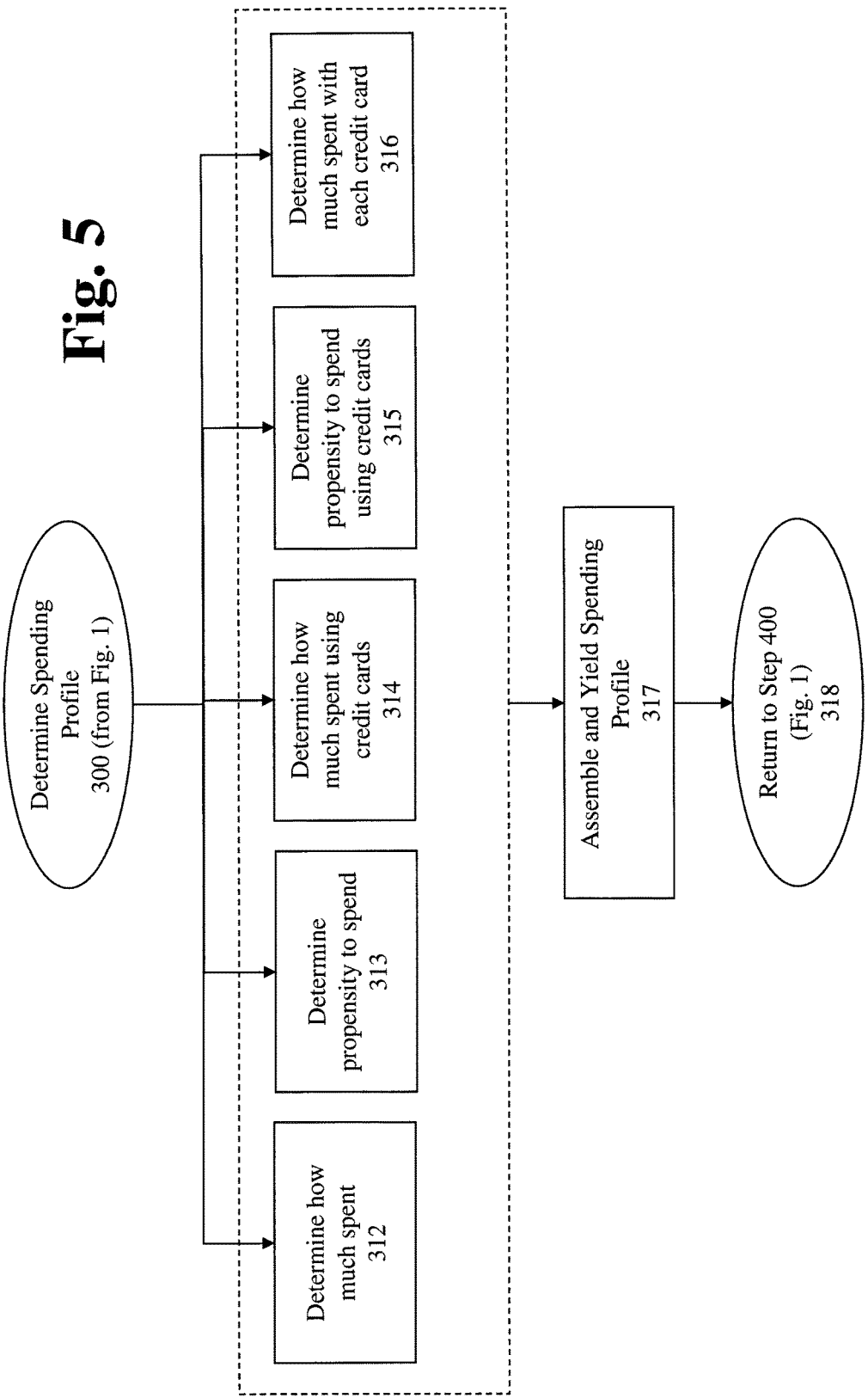
FIG. 5 is a flowchart showing further details of the "determine spending profile" step of FIG. 1 in accordance with one embodiment of the invention.

FIG. 5 is a flowchart showing further details of the determine spending profile step 300 of FIG. 1, in accordance with one embodiment of the invention. The sub-processes of FIG. 5 break down the customer's spending according to spending characteristics that may later be helpful in marketing products to that customer. For example, one embodiment in step 312 determines how much a customer spends and step 313 determines that customer's propensity to spend. For example, some customers may have a low propensity to spend even though they are high spenders simply because they have an enormous amount available to spend, spend only a small portion of it, but that small portion is of significant magnitude. Another example is a customer with a high propensity to spend. That customer may readily make new purchases if given the appropriate opportunity and incentives. In some embodiments, the determination of the propensity to spend may be a determination of the percentage of a customer's ANCF that they spend.

Further, in step 314, one embodiment assesses a customer's total spend using credit cards. Step 315 estimates that customer's propensity to spend using credit cards and integrates that information into the customer's spending profile. One illustration of these concepts is a customer who spends a significant portion of their ANCF, but strictly uses cash. This customer is considered to have a high propensity to spend but has a low propensity to spend with credit cards. In accordance with one embodiment, step 316 further analyzes a customer's credit card spending characteristics by determining the customer's spending on particular credit cards.

Figure 13:
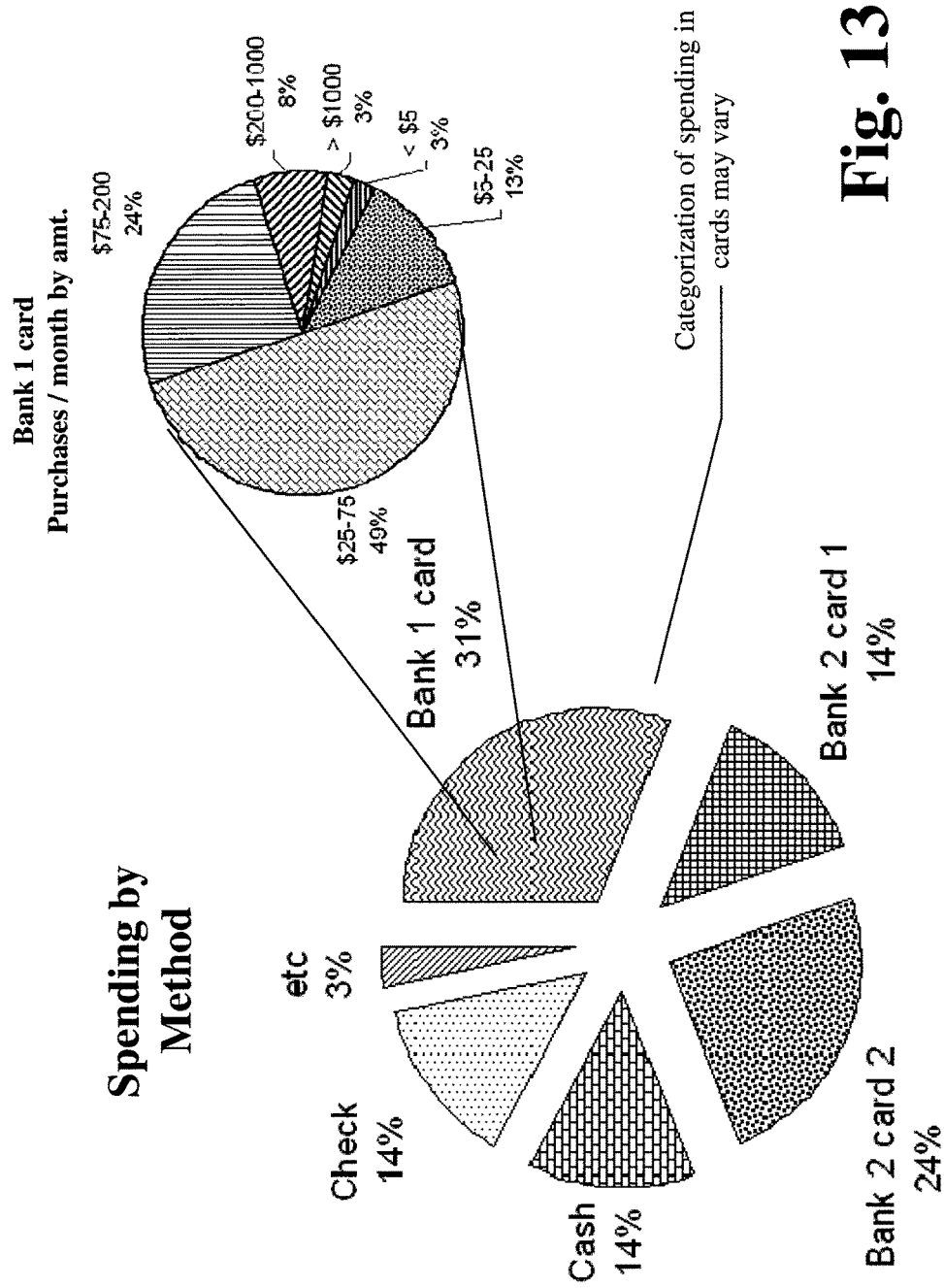
FIG. 13 is a diagram showing details of a spending profile, in accordance with one embodiment of the invention.

In accordance with one embodiment, FIG. 13 illustrates how some of these characteristics are manifest in a spending profile. Firstly, FIG. 13 shows a breakdown of a customer's spending by method (cash, check, bank 1 card, bank 2 card 1, bank 2 card 2). Thus, the bank 1 card accounts for 31% of the customer's spending. FIG. 13 also illustrates another slice of information from the spending profile in which the customer's spending through the bank 1 card is categorized according to the purchase amount for each purchase made on that card. Therefore, 24% of the customer's monthly purchases using the bank 1 card are between the amounts of $75 and $200.

It is appreciated that the categorization of the customer's spending through the bank 1 card may or may not be representative of the "bank 2 card 1" and the "bank 2 card 2" cards. In particular, it is appreciated that it may well be the case that different cards are routinely and consistently used for different purposes. Customers may well have fractional or compartmentalized spending. For example, a particular card may always be used for gas purchases, whereas another card is routinely used for purchases at a outlet store. Such might be the case due to a particular relationship between the merchant vis-à-vis the card, e.g. such as the merchant only takes that particular card of the customer, or for some other reason.

In particular, in accordance with aspects of the invention, it may well be the situation (as shown in FIG. 13) that there is indeed relatively complete visibility into one of the customer's (i.e., Bank 1 card), but not into the customer's other cards. Thus, the invention uses what data is known across "all the cards" of the customer, and analyzes such data to further understand what is not known about a customer's card (or other spend related information). Once attributes of the customer's other cards are known (to the extent possible) then target marketing may be effected, tailored specifically to those known attributes.

Figure 14:
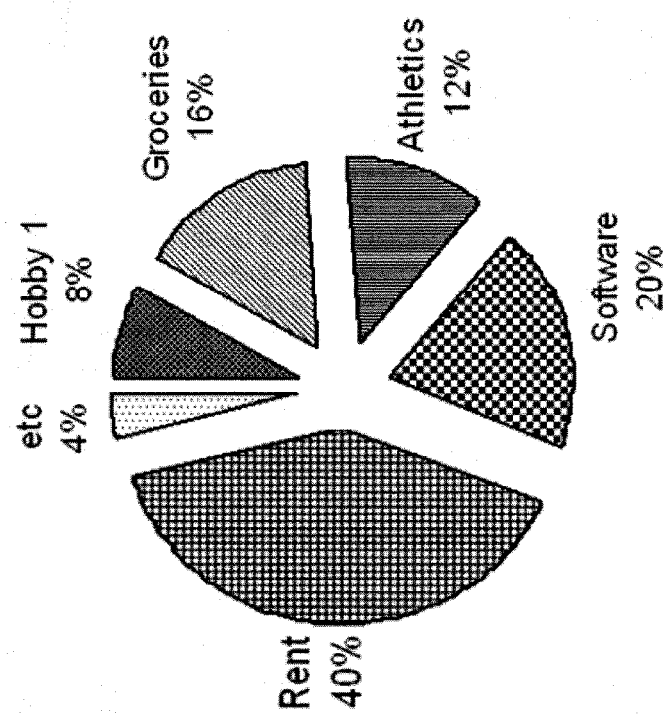
FIG. 14 is a diagram showing details of a spending profile, in accordance with one embodiment of the invention.

In accordance with one embodiment, FIG. 14 further illustrates aspects of a customer's spending profile. For example, the spending profile for that customer would indicate that 20% of the customer's spending is attributable to software purchases. One skilled in the art understands that a financial institution could extract these characteristics and many others from the previously mentioned data as well as other data sources. In one embodiment, even though access to the customer's other account information is not readily possible, the embodiment draws inferences from the available data in order to establish a more complete picture of that customer's spend. For example, the financial institution may observe a balance transfer from a different institution's credit card or a payment to that institution. These observations are interpreted as spend through that institution and are therefore relevant to the customer's spending profile. One embodiment assesses the spend through various credit card accounts by reviewing the financial summary obtained when the customer opened the credit card account with the financial institution. Such a report, for example, provides insight into the spending behavior of the customer. Referring again to FIG. 5, step 317 assembles these characteristics, in addition to numerous others as desired by the financial institution, into a spending profile for the customer. As previously illustrated, this detailed spending profile represents an increased understanding of customers' spending preferences and behaviors. The method then returns to step 400 (of FIG. 1).

Figure 11:
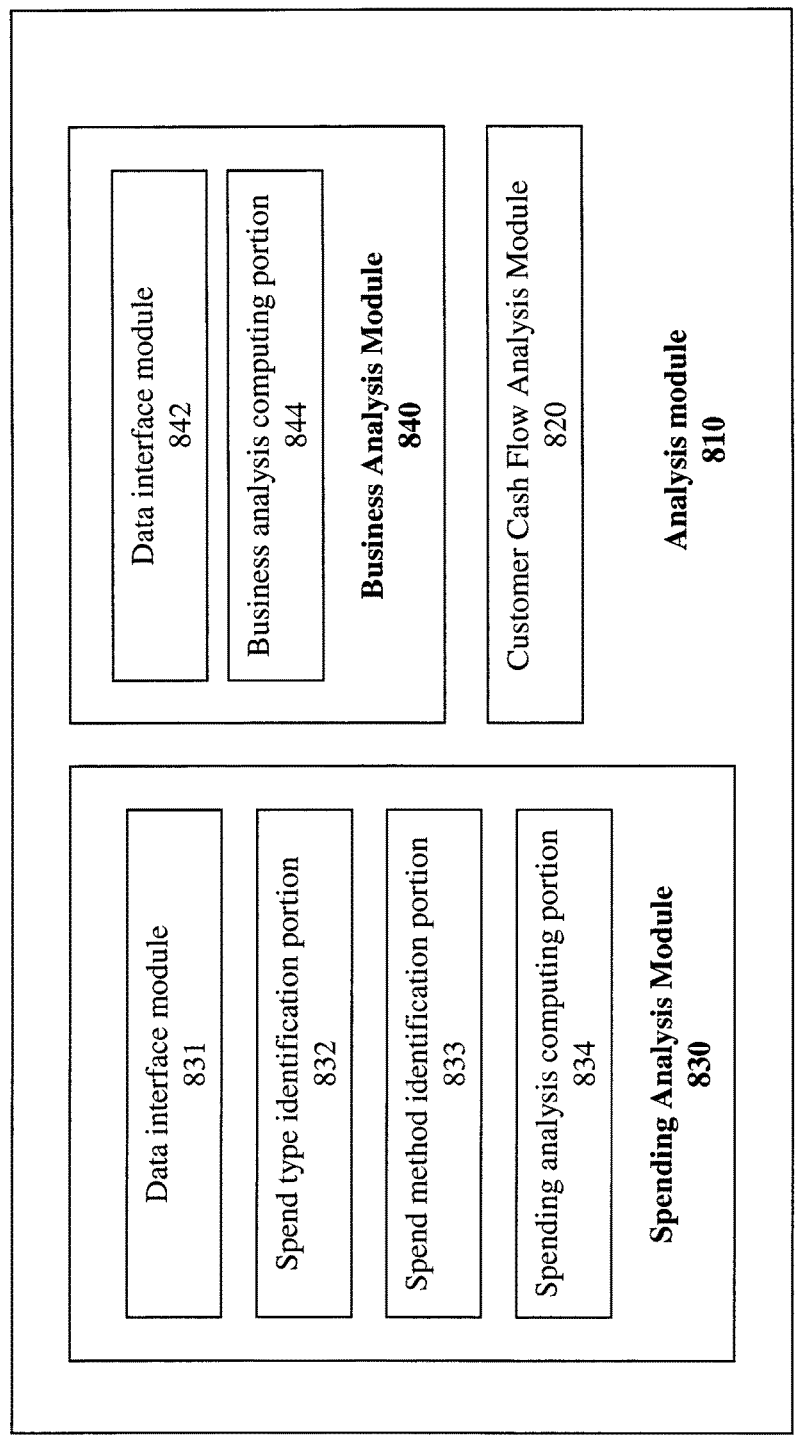
FIG. 11 is a block diagram showing further details of the spend system, and in particular the analysis module, in accordance with one embodiment of the invention.

FIG. 11 contains a block diagram depicting the spending analysis module 830, according to one embodiment. This module includes a data interface module 831, spend type identification portion 832, spend method identification portion 833 and a spending analysis computing portion 834. The data interface module 831 enables access to data by interfacing with the data access module 850. The spend type identification portion 832 and the spend method identification portion 833 process the data obtained by the data interface module 831 in accordance with the spend profile characteristics desired in the particular embodiment. The spending analysis computing portion 834 analyzes the data processed in the spend type identification portion 832 and the spend method identification portion 833, as well as other data as seen fit, and produces a spending profile for the customer.

The spending profile is stored in the customer profile data store module 860 previously mentioned in FIG. 9. One embodiment of the customer profile data store module 860 is shown in further detail in the block diagram of FIG. 12. Therein the customer profile data store module is shown to include an available to spend data store portion 862, spending profile data store portion 864 and a potential credit card business data store portion 866. The customer profile data store module 860 is therefore capable of storing a dossier of information for each customer, where the information may be created through analysis of the spend system 800 or acquired directly from other sources.

Figure 6:
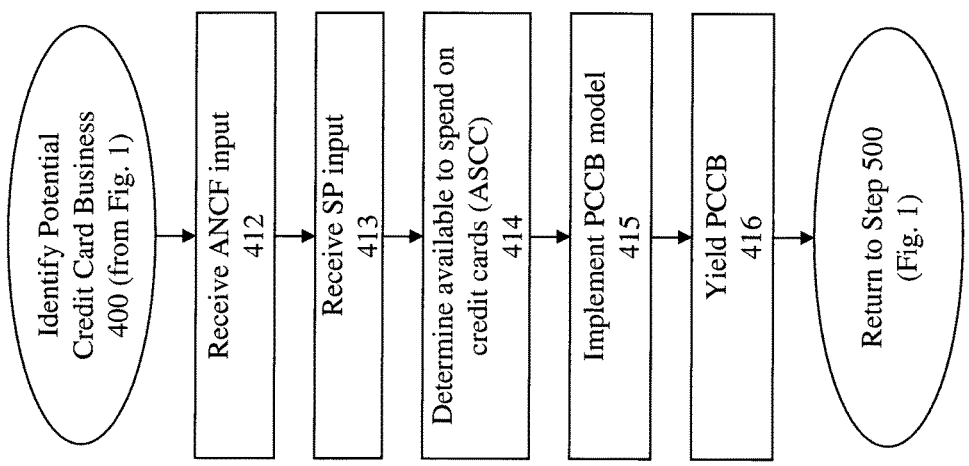
FIG. 6 is a flowchart showing further details of the "identify potential credit card business" step of FIG. 1 in accordance with one embodiment of the invention.

FIG. 6 is a flowchart that illustrates one embodiment of the methods of the invention. These method steps identify potential credit card business for the financial institution on an individual customer level. Step 412 of the potential credit card business identification process leverages the product of the ANCF analysis. Step 413 similarly incorporates the spending profile analysis into the identification of the potential credit card business. For example, as shown in step 414, one embodiment is particularly concerned with credit card spending and therefore determines the customers available to spend on credit cards. Such a determination for an individual customer provides the financial institution with an estimate of what further business could be acquired from that customer, for example.

Expanding a financial institution's business with a customer may occur in a number of different fashions. In accordance with one embodiment, step 415 implements the potential credit card business model to identify potential opportunities to shift that customer's spending to the financial institution from another institution. For example, the potential credit card business model identifies such an opportunity by observing in the customer's spending profile that the customer always spends using the credit card with the highest rewards when making a major purpose, such as purchasing a new car. Therefore, the customer is demonstrating a preference for a credit card attribute that the financial institution is able to meet, and that amount of spending is therefore deemed the potential credit card business. Step 415 may also identify the potential credit card business as opportunities to simply increase the customer's spending. In accordance with one embodiment, the potential credit card business model identifies that the customer has an apparent surplus of ANCF. The spending profile of the customer reveals that although the customer has a few particular hobbies or pastimes, the customer is averse from spending significantly on those hobbies, possibly due to cognitive reluctance or guilt associated with luxury expenses. The potential credit card business model identifies these characteristics in the spending profile and indicates the possibility of unleashing the surplus ANCF with financial products that reward the customer for spending on a particular hobby. Thus, the potential credit card business in one embodiment is achieved not by displacing the customer's current spending habits but by encouraging additional spending. After the implementation of the potential credit card business model in step 415, step 416 outputs the customer's potential credit card business, and the method returns to step 500.

Figure 7:
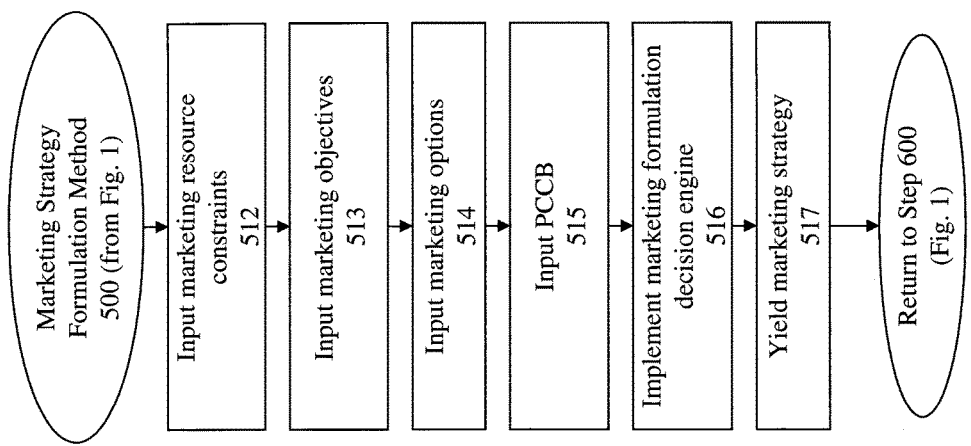
FIG. 7 is a flowchart showing further details of the "formulate marketing strategy" step of FIG. 1 in accordance with one embodiment of the invention.

The identification of potential credit card business on an individual customer basis provides the financial institution with a competitive advantage that can be exploited by the appropriate marketing strategy. FIG. 7 is a flowchart that depicts one embodiment of a method for producing a marketing strategy. The method allows for the incorporation of germane inputs to the marketing formulation, and these inputs may vary greatly from embodiment to embodiment.

In FIG. 7, step 512 shows the input of marketing resource constraints. Resource constraints may include limitations on marketing expenses or the duration of a marketing promotion, among many others. Step 513 depicts the input of marketing objectives. Previously described embodiments have demonstrated the objective of increasing the share of a customer's spending through the financial institution. One embodiment has a marketing objective of increasing the customer's satisfaction with the financial institution. For some embodiments, the marketing strategy objective may be to help inculcate healthy spending habits in the customer in order to ensure financial stability and a long and healthy financial relationship with the financial institution.

Step 514 illustrates the input of marketing options into the marketing strategy formulation method 500. Marketing options may include anything that the financial institution deems helpful in pursuing its marketing objectives. These options pertain to, for example, both the manner in which marketing is conducted and the products or value proposition marketed to the customer. In one embodiment, the marketing approaches include, but are not limited to, direct mail/catalog, online, outbound email, outbound telemarketing, inbound calls, statements and account management, statement inserts, cell phone/text messaging, personal bankers conducting an interview with the customer, special recognition at a bank or other entity, special ATM message, and special web site message, for example. In accordance with one embodiment, the products marketed may have customized pricing schedules, cash back levels, partnerships with other businesses, travel programs, gift programs, or be designed to adjust intelligently to the customer's evolving behaviors, for example.

In one embodiment, step 515 incorporates analytical outputs of other method steps such as potential credit card business into the marketing strategy formulation method 500. Step 516 implements the marketing formulation decision engine 516. In one embodiment this decision engine performs an optimization using known techniques to most effectively achieve the marketing objectives using the marketing options while not exceeding the marketing resource constraints. Various techniques are known in the art for performing such processing, such as those described in U.S. patent application Ser. No. 12/099,578, which is incorporated by reference herein in its entirety.

In one embodiment the invention produces multiple marketing strategy's for each customer. Step 517 then outputs the at least one marketing strategy produced by the marketing formulation decision engine 517, and then the process continues with step 600.

The processing for the above mentioned method steps is supported by the spend system 800 block diagram in FIG. 9. One embodiment of the analysis module 810 of the spend system 800 is depicted in greater detail in FIG. 11. The analysis module 810 includes a business analysis module 840. The business analysis module 840 further includes a data interface module 842 and business analysis computing portion 842. The data interface module 842 performs the function of an interface with other modules and data portions of the spend system 800 (for example the data access module 850 or the customer profile data store module 860). The data interface module 842 therefore enables the business analysis module 840 to isolate data or results helpful in the business related methods of the system, such as the determination of a customer's potential credit card business. The business analysis computing portion 844 processes the data obtained by the data interface module 842. In accordance with one embodiment, these computations produce a customer's potential credit card business.

Figure 12:
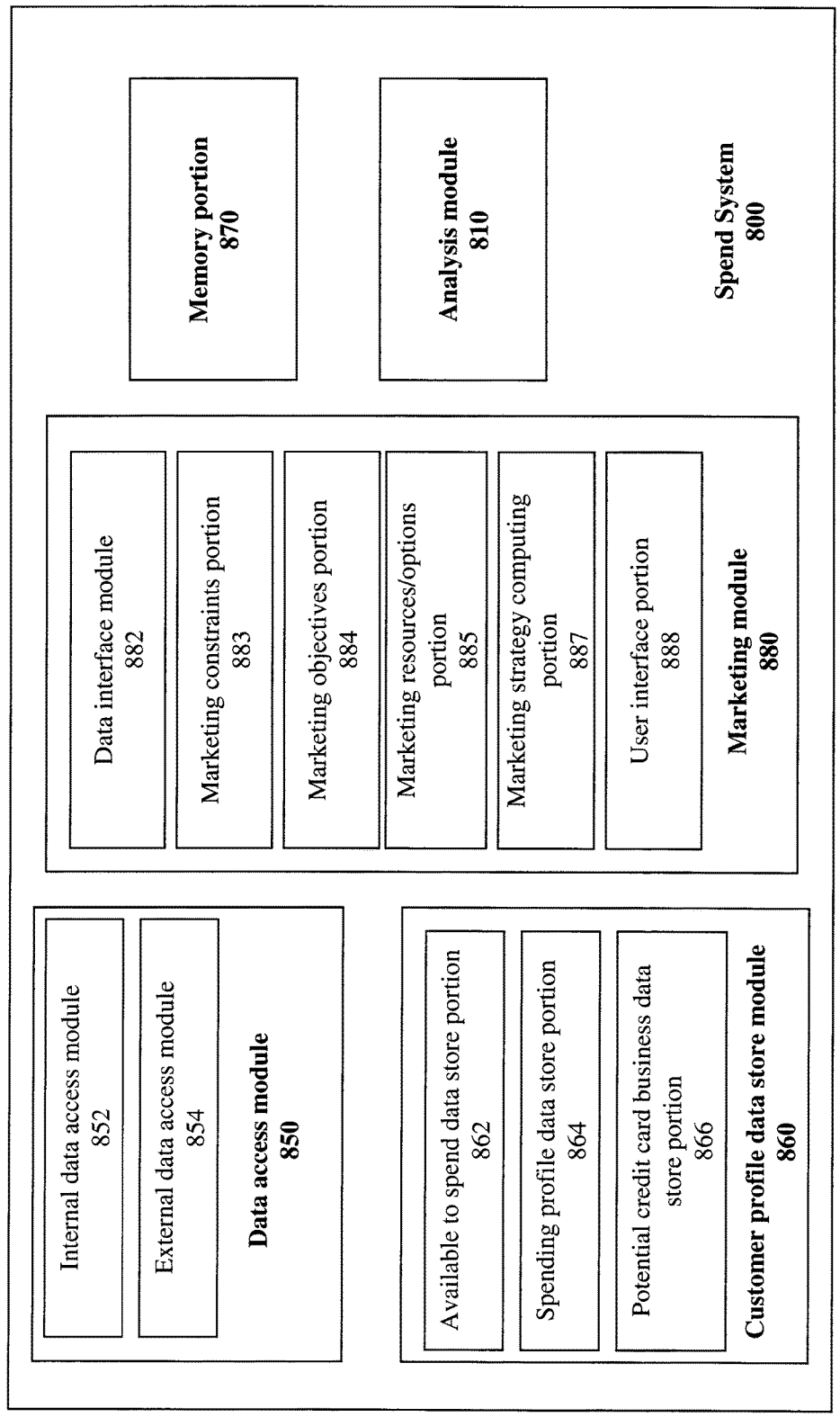
FIG. 12 is a block diagram showing further details of the spend system, in accordance with one embodiment of the invention.

Referring again to the block diagram of FIG. 12, one embodiment of the spend system 800 includes a marketing module 880. The marketing module 880 further includes a data interface module 882. The data interface module 882 performs the function of an interface with other modules and data portions of the spend system 800 (for example the data access module 850 or the customer profile data store module 860). The data interface module 882 therefore enables the marketing module 880 to isolate data or results helpful in the marketing related methods of the system, such as the formulation of a marketing strategy.

The marketing module 880 further includes a user interface portion 888. The user interface portion 888 enables the manipulation of the marketing module 880 by a human or virtual user. In accordance with one embodiment, the user interface portion 888 includes a computer terminal running a graphical interface through which a user may modify, provide inputs or retrieve outputs from the marketing module 880. The marketing constraints portion 883, in accordance with one embodiment, contains constraints relevant to the formulation of a marketing strategy. These constraints may be provided by the user interface portion 888, for example. Similarly, the marketing objectives portion 884 and the marketing options portion 885 within the marketing module 880 also contain information relevant to the formulation of a marketing strategy. Such information has been discussed previously with regards to the formulate marketing strategy step 600 in FIG. 1.

In accordance with one embodiment, the marketing strategy computing portion 887 performs processing to produce a marketing strategy. The processing done by the marketing strategy computing portion 887 utilizes the information in the other portions of the marketing module 880. The marketing strategy may take a variety of forms. The marketing strategy may well target customers that have the potential for substantially more business. For example, in accordance with one embodiment of the invention, the marketing strategy might identify the potential differential in spend of a customer. That is, the processing described herein may identify customers that have a large spend in total, but a small spend with the inquiring bank (i.e., the bank performing the assessment). Thus, the potential differential in spend is the difference between the total spend and the spend with the inquiring bank. Customers might be targeted with a differential spend per year of more than a particular number, such as $20,000, for example. Further, with such customers, the marketing strategy may assess the best manner in which to capture the additional spend. For example, if no gas is being purchased with the inquiring bank's card, then a gas card might be provided to the customer. In general, an approach is to identify the particular activity for which spend is not being captured and provide marketing directly on point to the activity. Relatedly, the other card (or the issuer of the other card) might be identified, and the marketing material set out why the inquiring bank's card is better vis-à-vis the other bank's card, or why the inquiring bank's card is better for a particular purpose. In short, the systems and methods of embodiments may deduce the best course of action (e.g. the best offer) to extend so as to secure the additional business of the customer.

Step 600 in FIG. 1 depicts the execution of the marketing strategy (EMS), in accordance with one embodiment. The execution of the marketing strategy involves the actual performance of at least some of the options chosen by the MS. One embodiment performs execution of an individual's marketing strategy in conjunction with the customized marketing strategy's of other customers. Such coordination would allow for economies of scale with regards to marketing activities such as the direct mail promotion of a single product package or the targeting of geographic clusters of customers.

In accordance with one embodiment, the marketing module 880 supports the execution of a marketing strategy in accordance with the results of the formulation of the marketing strategy. Thus, the marketing module 880 effects the various steps associated with the particular marketing strategy. For example, based on the marketing strategy results, the marketing module 880 may control processing including effecting mailings, sending e-mails, prompting telephone communications, waiting for predetermined time periods, controlling the sequence of which channels are used and when, and controlling the customers that are contacted (and in what manner particular customers are contacted). The marketing module 880, in implementing the marketing strategy, may utilize other systems and/or dictate the action of persons through the user interface portion, for example. In particular, the marketing module 880 may take action based on certain trigger events, such as a particular event or chain of events. For example, a particular trigger event may result in a live chat session being extended to the customer. Based on the particular trigger event (or other information), participants in the chat session may be presented with related information. For example, a bank representative might be automatically presented with the subject matter of the particular item the customer is requesting. Various other communications and action may be based on trigger events and/or interrelated so as to be effected in concert vis-à-vis each other (or vis-à-vis some other event).

Figure 8:
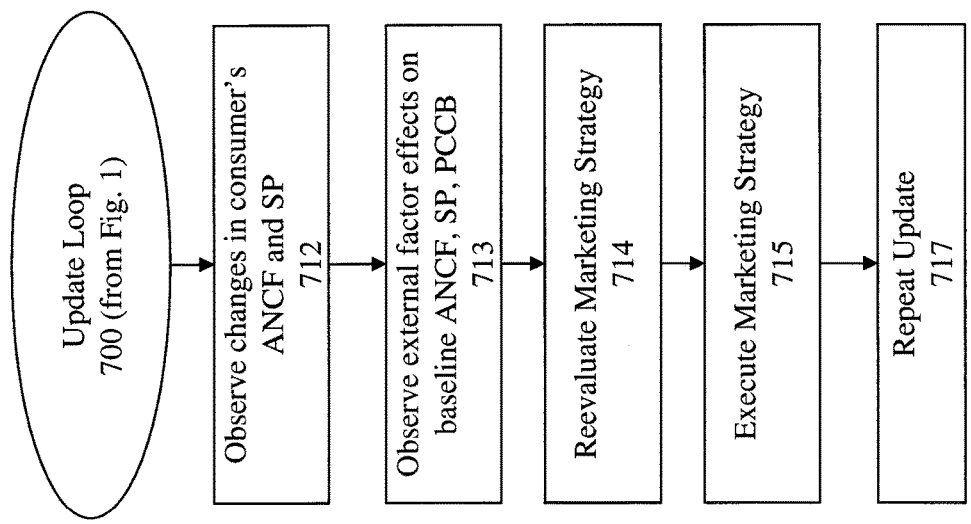
FIG. 8 is a flowchart showing further details of the "update loop" step of FIG. 1 in accordance with one embodiment of the invention.

Accordingly, the marketing module 880 carries out the marketing strategy over some period of time. At a point in time, the execution of the marketing strategy will draw to a close, or at least be sufficiently advanced. Accordingly, in some embodiments, an update loop 700, as introduced in FIG. 1 and shown in detail in FIG. 8, reevaluates other method steps in a continuous or occasional fashion. Step 712 shows how observed changes of the customer's behavior (as indicated by ANCF or spending profile, for example) may trigger updates. Step 713 illustrates how the update loop 700 includes observations of changes in factors external to the customer. In one embodiment, the update loop 700 observes a change in a customer's ANCF and re-determines the customer's spending profile, potential credit card business and marketing strategy accordingly. Such a change in ANCF may become apparent after a job loss, for example. Further, marriage or the birth of a child may change a customer's spending profile and indicate an opportunity for the update loop to reevaluate the marketing strategy for that customer. As a final example, step 713 may observe a change in gas prices and therefore incorporate that information in the update loop 700. These changes, as well as effects brought about by the execution of a marketing strategy, may trigger the update loop 700. One embodiment regularly employs the update loop 700 so that it is not dependent on a triggering event. In one embodiment, the updating of the marketing strategy 714 and the execution of the updated marketing strategy 715 occurs in a manner similar to the development of the original marketing strategy. The update loop 700 updates the other method steps in a manner similar to their original execution.

In accordance with one embodiment shown in FIG. 12, The data access module 850 and the memory portion 870 work in conjunction to both store data, provide processing and enable modules in the spend system to access data and computing resources. The data access module 850 provides access to data stored internally 852 to the system as well as data external to the system 854. The storage of such data may be transitioned between the data access module 850 and the memory portion 870 dependent on the needs of the spend system 800. For example, data archived for lengthy periods of time may be transitioned from the data access module 850 to the memory portion 870 and vice versa.

Data may take on a wide variety of forms as described herein, in addition to those previously mentioned. Data stored internally may include data representing one or more mathematical frameworks utilized by processing modules within the spend system 800. Further, the data access module 850 may include data relating to the variables used in the processing and computations of other modules, including values for the variables.

A wide variety of data may processed by the systems and methods of embodiments of the invention. Illustratively, for example, such data may include time series data (e.g., data based on or relating to events and time values associated with those events), data based on time of year parameters, aggregated data (such as data aggregated at the individual, household, small business, or large business level, for example), merchant related data in general, customer related data in general, data reflecting various subsetting of data (such as subsetting out the most relevant activity), and data that is bounded in some manner (such as to control outliers). Various other types of data may also be used in the processing described herein.

Various types of statistical analysis, including, in particular, probabilistic analysis and probabilistic modeling may be applied in the various processing as described herein. For example, based on data from a customer (or a number of customers) such data may estimate particulars regarding another customer. Such estimation may include a range of certainty, i.e., such estimation may include statistical boundaries of certainty. Thus, the another customer's spend capability might be estimated to be $3,000 per month, plus or minus $1,000. Based on such range of certainty, other analysis may then be performed on the another customer. Accordingly, the various processing described herein may use discreet values, ranges, and certainty parameters associated with such discreet values and ranges.

As described above, FIGS. 9-14 show embodiments of structure and system of the invention. Further, FIGS. 1-8 show various steps in accordance with one embodiment of the invention. It is appreciated that the systems and methods described herein may be implemented using a variety of technologies. Hereinafter, general aspects regarding possible implementation of the systems and methods of the invention will be described.

It is understood that the system of the invention, and portions of the system of the invention, may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ANCFIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for determining a capacity to spend of a financial services customer, the system comprising:
    a memory module that inputs and stores both customer profile data and retail data of the financial services customer, the customer profile data comprising financial attributes of the financial services customer, and the retail data including purchase information from purchases made by the financial services customer;
    an analysis module, the analysis module configured to:
        generate an estimated top-down available net cash flow of the financial services customer based on the customer profile data and retail data of the financial services customer,
        input data regarding a customer control group, including financial attributes of control customers in the customer control group;
        compare financial attributes of the financial services customer with financial attributes of the control customers to determine similar control customers that possess similar attributes to the financial services customer;
        generate an estimated bottom-up available net cash flow of the financial services customer based on available net cash flows of the similar control customers;
        compare the estimated top-down available net cash flow to the estimated bottom-up available net cash flow to yield an available net cash flow for the financial services customer,
    wherein the available net cash flow of the financial services customer constitutes a capacity to spend of the financial services customer on a recurring basis; and
    a marketing module configured to:
        generate customized marketing material for the financial services customer based on the available net cash flow for the financial services customer, the marketing material including a customized offer for at least one financial product;

send the customized marketing material to the financial services customer; and receive an acceptance, from the financial services customer, of the customized offer for at least one financial product.

2. The system of claim 1, wherein generating an estimated top-down available net cash flow of the financial services customer includes the analysis module:

inputting income data and budgetary items data of the financial services customer, such data included in the customer profile data; and determining a differential between the income data and budgetary items data, the differential being the available net cash flow.

3. The system of claim 2, wherein the income data includes identifying monies from salary, investments and gifts.

4. The system of claim 2, wherein the analysis module segregates data such that the budgetary items data and the estimated top-down available net cash flow does not include monthly expenses payable by a card-based transaction.

5. The system of claim 4, wherein a card based transaction is constituted by either a transaction effected using a credit card or a transaction effected by using a debit card.

6. The system of claim 1, wherein the analysis module determining an available net cash flow of the financial services customer includes determining a breakdown between cash spend and credit card spend.

7. The system of claim 1, wherein the financial attributes of control customers include spending habits of the control customers.

8. The system of claim 1, wherein the control customers are constituted by persons who perform all their financial card-based transactions via a single financial institution.

9. The method of claim 1, wherein the comparing attributes of the customer with financial attributes of control customers to determine similar control customers that possess similar attributes to the financial services customer, includes:

identifying a known attribute as a key parameter, retrieving the value of the key parameter of the financial services customer;

identifying similar control customers who have a similar value of the key parameter;

estimating unknown parameters of the financial services customer based on attributes of the identified control customers.

10. The system of claim 1, the marketing module generating marketing material includes identifying a particular activity for which spend is not being captured and generating marketing on point to the particular activity.

11. The system of claim 10, the marketing module generating marketing material includes the marketing module effecting an online chat session with the financial services customer.

12. The system of claim 1, the marketing module generating marketing material is performed in response to an observed trigger event.

13. A computer implemented method for determining a capacity to spend of a financial services customer, the method comprising:

inputting and storing, by a memory module, both customer profile data and retail data of the financial services customer, the customer profile data including financial attributes of the financial services customer, and the retail data including purchase information from purchases made by the financial services customer;

generating, by an analysis module, an estimated top-down available net cash flow of the financial services customer based on the customer profile data and retail data of the financial services customer;

inputting data regarding a customer control group, including financial attributes of control customers in the customer control group;

comparing financial attributes of the financial services customer with financial attributes of the control customers to determine similar control customers that possess similar attributes to the financial services customer;

generating an estimated bottom-up available net cash flow of the financial services customer based on available net cash flows of the similar control customers;

comparing the estimated top-down available net cash flow to the estimated bottom-up available net cash flow to yield an available net cash flow for the financial services customer;

wherein the available net cash flow of the financial services customer constitutes the capacity to spend of the financial services customer on a recurring basis;

generating, by a marketing module, customized marketing material for the financial services customer based on the available net cash flow for the financial services customer, the marketing material including a customized offer for at least one financial product;

sending the customized marketing material to the financial services customer; and receiving an acceptance, from the financial services customer, of the customized offer for at least one financial product.

14. The system of claim 1, wherein the analysis module:

produces a profile of the financial services customer's financial information, the profile including an itemization of the financial services customer's monetary inflow and outflow;

identifies a portion of the financial services customer's monetary flow eligible to be conducted through a financial institution, the identification based in part on the financial services customer's profile; and does not require direct input from the financial services customer.

15. The system of claim 1, wherein the analysis module:

selects a study group of customers from data, the data including at least one of the customer profile data and the retail data of the financial services customer;

observes the study group so as to produce a profile of each study group customer's financial information;

produces a mathematical representation of an interrelationship between study group customer's profiles and the data;

applies the mathematical representation to identified customers not within the study group in order to estimate those identified customer's profiles;

identifies a portion of each identified customer's monetary flow eligible to be conducted through a financial institution, the identification based in part on the identified customer's profile; and does not require direct input from the customer.

* * * * *